United States Patent
Boone et al.

(10) Patent No.: US 10,442,936 B2
(45) Date of Patent: Oct. 15, 2019

(54) COATINGS HAVING IMPROVED RESISTANCE TO STAINS AND DIRT

(71) Applicant: Arkema France, Colombes (FR)

(72) Inventors: Alain Boone, Verderonne (FR); Jerome Mazajczyk, La Croix Saint Ouen (FR); Gregory A. Delmas, Senlis (FR); Claire Chambat, Orlienas (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/771,140

(22) PCT Filed: Oct. 25, 2016

(86) PCT No.: PCT/FR2016/052773
§ 371 (c)(1),
(2) Date: Apr. 27, 2018

(87) PCT Pub. No.: WO2017/081384
PCT Pub. Date: May 18, 2017

(65) Prior Publication Data
US 2019/0077971 A1    Mar. 14, 2019

(30) Foreign Application Priority Data

Nov. 10, 2015   (FR) ...................... 15 60749

(51) Int. Cl.
| | | |
|---|---|---|
| *C08F 2/24* | (2006.01) | |
| *C08F 212/08* | (2006.01) | |
| *C08F 220/06* | (2006.01) | |
| *C08F 220/18* | (2006.01) | |
| *C08F 220/40* | (2006.01) | |
| *C08F 265/06* | (2006.01) | |
| *C09D 151/00* | (2006.01) | |
| *C09D 5/02* | (2006.01) | |

(52) U.S. Cl.
CPC ............... *C09D 5/027* (2013.01); *C08F 2/24* (2013.01); *C08F 265/06* (2013.01); *C09D 5/022* (2013.01); *C09D 151/003* (2013.01); *C08F 212/08* (2013.01); *C08F 220/06* (2013.01); *C08F 220/18* (2013.01)

(58) Field of Classification Search
CPC ........ C08F 2/24; C08F 265/06; C08F 212/08; C08F 220/06; C08F 220/18; C09D 5/027; C09D 5/022; C09D 151/003
See application file for complete search history.

(56) References Cited

U.S. PATENT DOCUMENTS

| | | |
|---|---|---|
| 5,756,753 A | 5/1998 | Trumbo et al. |
| 6,465,562 B1 | 10/2002 | Charmot et al. |
| 7,307,966 B2 | 12/2007 | Hussain |
| 2005/0107527 A1 | 5/2005 | Holub et al. |
| 2007/0208129 A1 | 9/2007 | Finegan et al. |
| 2014/0065435 A1 | 3/2014 | Overbeek |
| 2016/0289489 A1 * | 10/2016 | Betremieux .......... C08F 285/00 |

FOREIGN PATENT DOCUMENTS

WO   WO-2015/071590 A1 *   5/2015

* cited by examiner

*Primary Examiner* — Irina S Zemel
*Assistant Examiner* — Jeffrey S Lenihan
(74) *Attorney, Agent, or Firm* — Lynn B. Morreale

(57) ABSTRACT

The invention relates to aqueous coating compositions based on an aqueous polymer dispersion as binder, having high performance levels of resistance to stains and dirt without specialist functional monomers. Said aqueous polymer dispersion having an MFFT between 0 and 50° C. comprises polymer particles obtained by emulsion polymerization in at least two steps with at least two polymer phases P1 and P2, P1 representing from 75 to 90% by weight of P1+P2 having a Fox Tg1 from 0 to 40° C. and P2 having a Fox Tg2 from 0 to 40° C., said polymer P2 representing from 10 to 25% by weight of the sum of polymers P1 and P2 and having a calculated Hansch parameter <2.0 and at least one ethylenically unsaturated monomer bearing an acetoacetoxy and/or amine or ureido functional group, said acetoacetoxy and/or amine or ureido functional group being borne by the external surface of P2 phase.

13 Claims, No Drawings

COATINGS HAVING IMPROVED RESISTANCE TO STAINS AND DIRT

CROSS-REFERENCE TO RELATED APPLICATIONS

This application is a national stage application under 35 U.S.C. § 371 of PCT/FR2016/052773, filed Oct. 25, 2016 which claims benefit to application FR15.60749, filed Nov. 10, 2015.

The invention relates to an aqueous coating composition comprising, as specific binder, an aqueous polymer dispersion of which the composition and the structure make it possible to obtain decorative coatings which have improved resistance to stains and which are less expensive compared with the solutions known from the prior art. The invention also relates to the specific binder polymer dispersion of the coating composition, to the method for obtaining same and to the uses of said dispersion as binder and of said coating composition comprising same.

More particularly, the invention relates to coatings based on polymers having barrier properties which limit the color modification of coatings in contact with staining or soiling products and which thus protect various substrates against stains and dirt, in particular domestic stains and dirt, with a spectrum of resistance to domestic stains and dirt that is at least as broad as that for linked coating dispersions and compositions known from the prior art, the latter requiring more sophisticated and expensive processing means and methods. The coatings in question are decorative coatings, such as paints, varnishes or inks, and more particularly decorative paints.

In particular, a quality paint must be able to retain a beautiful surface appearance throughout its use. Exterior coatings are for example subject to soiling due to dust and pollution. Interior coatings must, for their part, be resistant to domestic stains and dirt.

The commercially available systems have excellent stain-resistance properties, by virtue of the use, for the binder, of specialist monomers containing phosphorus, as described in EP 1 832 635, or for the coating composition such as paint, of additives which modify the surface hydrophobicity/hydrophilicity, such as microwaxes, PVDF (polyvinylidene fluoride) or silicones, which make it possible to achieve excellent levels of stain resistance, but with a considerable increase in costs with respect to the constraint of the use of specialist functional monomers for said binder or, for the coating composition, of very specific additives or components, for example fluoropolymers associated with organosilicates, as described in WO 2006/007052.

There is therefore a need to dispense with the forced use of these specialist functional monomers and of said very particular additives for coating compositions by searching for new binders that are easy to obtain by means of a simple method of radical emulsion polymerization, while at the same time targeting the same excellent level of performance, but without said specialist functional monomers of which the availability is restricted by a much higher cost compared with the basic monomers, such as those comprising a phosphate or phosphonic functional group, or without the specific additives added to the paint for this purpose (improving the performance level), and therefore with a final coating having no limitation, or constraint, regarding the need for particular monomers or particular additives and therefore having a better quality/cost ratio without the constraint of specific products, and therefore being inexpensive compared with existing products.

The invention, by virtue of simple choices of monomeric compositions and of the method, makes it possible to achieve excellent stain-resistance performance levels, at least equivalent to the systems described by the prior art and therefore allowing a more practical solution at a lower cost than the existing solutions.

The present invention relates more particularly to a polymer dispersion (emulsion) in water having a minimum film-forming temperature (MFFT) between 0 and 50° C., the dispersion comprising particles obtained in at least two emulsion polymerization steps, with a core polymer phase P1 and a shell polymer phase P2, the respective glass transition temperatures (Tgs) of which, calculated according to Fox, may be different, preferably identical to within plus or minus 2° C., and between −10 and +50° C., with different P1 and P2 compositions, each providing the latex film and the coating resulting therefrom with the required final barrier properties.

The P1 polymer phase represents from 20% to 90% by weight of the total P1+P2. The P2 phase represents from 10% to 80% by weight of the total P1+P2.

Furthermore and unexpectedly, the choice of this solution also makes it possible to achieve a very high level of hardness and of gloss at 20°, which is an additional advantage for this type of decorative paint because it makes it possible to equally formulate a gloss, satin or matte paint or varnish.

The first subject of the invention relates to a coating composition comprising the specific binder of specific composition and structure, without specialist functional monomers, such as phosphorus-containing or sulfonated monomers, and without said composition comprising specific additives for improving the resistance to stains and dirt.

Another subject of the invention relates to the use of said coating composition in applications for decorative coatings with a barrier effect.

The invention also covers the specific component binder of said coating composition according to the invention and also a specific preparation method.

Finally, the invention covers a coating which results from said coating composition or from the use of said specific binder of the present invention.

Consequently, the first subject of the invention relates to an aqueous coating composition, which comprises, as binder, an aqueous polymer dispersion, which dispersion has a minimum film-forming temperature (MFFT) according to ISO 2115 between 0 and 50° C., preferably between 0 and 40° C., and which comprises polymer particles obtained by radical emulsion polymerization in at least two steps, preferably in two steps and with said particles comprising at least two polymer phases P1 and P2, preferably two, with the P1 polymer phase representing from 75% to 90% by weight of the total polymer P1+P2 and the P2 polymer phase representing from 10% to 25% by weight of the total polymer P1+P2, with P1 having a glass transition temperature Tg1 calculated according to Fox and ranging from 0 to 40° C., preferably from 0 to 20° C., and P2 having a glass transition temperature Tg2 calculated according to Fox and ranging from 0 to 40° C., preferably from 0 to 20° C., and for Tg1 and Tg2 ranging from 0 to 20° C., which may be identical or different to within +2° C. and with said P1 polymer comprising structural units derived from 4 monomers M1 to M4 as follows:
at least one ethylenically unsaturated monomer M1 chosen from $C_4$ (meth)acrylic esters, preferably $C_4$ acrylic esters, meaning herein acrylic ester with the alkyl of said ester being $C_4$ alkyl, more preferentially M1 being butyl acrylate, and at least one ethylenically unsaturated monomer M2 chosen from vinyl aromatic monomers, in particular vinyl toluenes and styrene and preferably styrene, and at least one ethylenically unsaturated monomer M3 bearing a carboxylic acid group, and at least one monomer M4 having a function of internal crosslinking agent of said P1 phase, preferably chosen from monomers bearing at least two ethylenic unsaturations that are copolymerizable with the ethylenic unsaturations of the monomers M1 to M3 or bearing an ethylenic unsaturation and a blocked silane functional group in alkoxysilane form, said P2 polymer comprising structural units derived from 4 monomers M5 to M8 as follows:

at least one ethylenically unsaturated monomer M5 chosen from $C_4$ (meth)acrylic esters, preferably $C_4$ acrylic esters, which may be identical to or different than M1, at least one ethylenically unsaturated monomer M6 chosen from vinyl aromatic monomers, preferably styrene, which may be identical to or different than M2, and at least one ethylenically unsaturated monomer M7, the homopolymer of which has a Tg measured by DSC at 10° C./min of between 80 and 120° C. and a hydrophobicity value estimated by the logarithm of the partition coefficient between octanol and water (LogKow), Estimation Program Interface (EPI) Suite® KowWin of the US Environmental Protection Agency's Office of Pollution Prevention and Toxics and Syracuse Research Corporation (SRC) according to EPIWEB 4.1, ranging from 1 to 1.5, said monomer M7 preferably being methyl methacrylate, and at least one ethylenically unsaturated monomer M8 bearing an acetoacetoxy or amine or ureido functional group, said acetoacetoxy, amine or ureido functional group being borne by the external surface of the shell polymer phase P2, the P2 polymer phase thus obtained from M5, M6, M7 and M8 having a hydrophobicity characterized by the Hansch parameter rounded up to one decimal, of less than or equal to 2.0, calculated by adding the products of the mass fractions multiplied by the LogKow corresponding to each component monomer and preferably said P1 and P2 polymer phases being synthesized successively and with P2 being in the external layer of said polymer particle.

More particularly, the Hansch parameter of the P1 polymer is different and always higher than the Hansch parameter of the P2 polymer, preferably at least 0.2 units higher and more preferentially at least 0.3 units higher.

The hydrophobicity value which herein corresponds to the logarithm of the partition coefficient between octanol and water, LogKow, is estimated by the Estimation Program Interface (FPI) Suite® KowWin method developed by the Syracuse Research Corporation (SRC) according to EPI-WEB 4.1. Examples of LogKow values determined by EPIWEB 4.1 for certain monomers are mentioned in the experimental section.

For the polymers, the Hansch parameter is calculated for the present invention by adding with respect to i and for each monomer $M_i$, the product of the mass fraction $m_i$ (multiplied) by the corresponding $LogKow_i$ of each monomer $M_i$ of the polymer in question:

Hansch parameter=$\Sigma_i[m_i \cdot LogKow_i]$

The Tgs of the polymers according to the invention are calculated using the Fox equation:

$$1/Tg(\text{calculated in } ° K) = \Sigma_i(m_i/Tg_i)$$

with, $m_i$=mass fraction of the monomer $M_i$ in the copolymer and with $\Sigma_i\, m_i=1$ $Tg_i$=Tg in ° K of the homopolymer derived from $M_i$ The Tgs of the homopolymers are for example available in the Polymer Handbook, edited by J. Brandrup and E. H. Immergut, Interacience Publishers (3rd Printing June 1967). They are reproduced below.

More particularly, said binder, aqueous polymer dispersion according to the invention, is free of any monomer bearing a phosphate, phosphine, phosphonic, phosphodiester or fluorinated functional group, strong anionic acid group, in particular sulfonic acid group. Likewise, said coating composition is free of any silicone additive, fluorinated additive or microwax additive and of any addition of polymer or oligomer additives having a Tg greater than the average Fox Tg of polymer P1+P2, whether this addition is in dispersion form or whether it is in water-dispersible form. These polymer or oligomer additives are generally additives which modify (which are modifiers of) the surface of the coating film, in particular with respect to the hardness and the resistance to stains.

The average Fox Tg (average Tg calculated according to Fox) over the whole of the polymer, that is to say with respect to P1+P2, on the basis of Tg1 and Tg2, can vary from 0 to 40° C.

Preferably, said $C_4$ (meth)acrylic ester monomer M1 is selected from: n-butyl acrylate or methacrylate, isobutyl acrylate or methacrylate or tert-butyl acrylate or methacrylate, preferably from n-butyl acrylate or methacrylate, more preferentially n-butyl acrylate.

The ethylenically unsaturated monomer M2 is chosen from vinyl aromatic monomers, in particular vinyl toluenes, with o-, m-, p-vinyl toluene isomers, and styrene. The monomer M2 is preferably styrene.

Regarding the monomer M3, it is preferably selected from acrylic acid, methacrylic acid, fumaric acid and itaconic acid and preferably from acrylic acid or methacrylic acid.

Regarding said monomer M4, it is in particular chosen from multifunctional (meth)acrylic esters or a (meth)acrylate bearing an alkoxy-blocked silane group, $-Si(OR)_3$, with R being methyl or ethyl. The multifunctional (meth)acrylic esters (MFAs) have a (meth)acrylate functionality of at least 2 and preferably ranging from 2 to 4.

The monomer M5 of P2, having the same general definition as M1 of P1, selected from the same list mentioned above for M1, may be identical to or different than M1.

Likewise, the monomer M6 of P2 has the same general definition as the monomer M2 of P1 and may be identical to or different than M2 of P1.

The monomer M7 that is preferred according to the invention is methyl methacrylate.

Regarding said monomer M8, it is preferably selected, for an acetoacetoxy functional group, from acetoacetoxy ethyl (meth)acrylate (AAEM) and, for an amino functional group, from 2-dimethylaminoethyl (meth)acrylate (MADAME) and, for a ureido functional group, from ureido (meth)acrylates. The ureido (meth)acrylates are used in the form of a solution in methyl methacrylate or in aqueous solution in water.

Preferably, the content by weight of M3 relative to P1 ranges from 1% to 10% and more preferentially from 1% to 5%. The weight content of internal crosslinking agent M4 in P1 can range from 0.1% to 1% and preferably from 0.1% to 0.5%.

Regarding the weight content of M8 In P2, it can range from 4% to 16% and preferably from 4% to 8% relative to the weight of P2.

More particularly, the weight contents of the monomers M1 to M4 in P1 can vary relative to the weight of P1, in particular for M3 being methacrylic acid, according to the following ranges:

M1: from 55% to 28%, preferably from 55% to 42%
M2: from 34% to 71%, preferably from 34% to 57%
M3: from 1% to 10%, preferably from 1% to 5%
M4: from 0.1% to 1%, preferably from 0.1% to 0.5%
with the sum of % M1+M2+M3+M4=100%.

More particularly, regarding the weight contents of the monomers M5 to M8 in P2, they can vary relative to the weight of P2, according to the following ranges:

M5: from 51% to 21%, preferably from 51% to 33%
M6: from 18% to 50%, preferably from 18% to 38.5%
M7: from 20% to 52%, preferably from 20% to 40.5%
M8: from 4% to 16%, preferably from 4% to 8%
with the sum of % M5+M6+M7+M8=100%.

Said coating composition is selected in particular from: paint, varnish or ink, preferably from paint and varnish. More particularly, it is a decorative coating composition, preferably a paint or varnish composition, more preferentially a paint composition. According to one particular preference, it is a barrier coating composition, in particular a stain-resistant and dirt-resistant coating composition, more particularly a domestic stain-resistant and dirt-resistant coating composition. Said coating composition can also be a corrosion-resistant coating composition. According to an even more particular option, said coating composition can be a coating composition that is both stain resistant and corrosion resistant.

Another subject of the present invention relates to the use of a coating composition as defined above, for obtaining decorative coatings with a barrier effect, in particular for protection against domestic stains and dirt. Said use can apply in particular to the protection of a substrate after coating, with respect to stains and dirt, with it being possible for said substrate to be chosen from: wall substrate made of plaster or cement, wood, cardboard, wallpaper, glass, metal substrates such as aluminum, zinc and steel. A particular use is for decorative coating on a metal substrate that is resistant to corrosion and to stains or dirt, as already mentioned above.

Also part of the present Invention is the specific aqueous polymer dispersion as defined above as binder in said coating composition according to the invention. Said aqueous polymer dispersion is the main component of the coating composition of the invention and it is indeed the subject produced as defined for said coating composition which herein is the subject of the invention.

The invention also relates to a process for preparing an aqueous dispersion as defined above, which comprises at least two steps, preferably two steps, of polymerization corresponding respectively to the P1 and P2 polymer phases:

i) first step of emulsion polymerization, Including a step of polymer seeding, of a first composition of monomers comprising in emulsion said monomers M1, M2, M3 and M4 as defined above according to the invention and corresponding to the P1 polymer phase, with said monomer M3 being in predominantly salified form, and followed by a ii) second step of emulsion polymerization of a second composition of monomers comprising in emulsion said monomers M5, M6, M7 and M8 as defined above according to the invention and corresponding to the P2 polymer phase, said polymerization preferably being carried out under pH conditions of less than or equal to 9 and of at least 7 ($7 \leq pH \leq 9$) and more preferentially less than or equal to 8 and of at least 7 ($7 \leq pH \leq 8$).

Also part of the invention is the use of a dispersion as defined above or obtained by means of a process as defined above, as binder in coating compositions, for barrier coatings which are resistant to stains and dirt and/or optionally which protect metal substrates against corrosion. More particularly, said coatings are applied to a substrate chosen from: metal, plaster, cement, wood, including chipboard, glass, cardboard, paper, ceramic and tiling.

Finally, part of the invention is the final product obtained, which is a coating, in particular a paint coating, obtained from at least one coating composition as defined above according to the invention or from an aqueous dispersion as defined according to the invention or from an aqueous dispersion obtained by means of a process as defined according to the invention.

The examples which follow are given by way of illustration of the invention and of the performance levels thereof, without in any way limiting the scope of the invention.

EXPERIMENTAL SECTION

1) Starting materials for preparing the dispersions

TABLE 1

Starting materials used in the synthesis of the dispersions

| Constituent | Function | Chemical nature | Supplier |
|---|---|---|---|
| Polirol ® PHE 925A | Surfactant | Alkyl ether phosphate ammonium salt 25% in water | Lamberti |
| Disponil ® FES 32 | Surfactant | Fatty alcohol sulfate polyglycol ether, sodium salt 31% in water | BASF |
| BuA | Monomer M1, M5 | Butyl acrylate | Arkema |
| Sty | Monomer M2, M6 | Styrene | BASF |
| MMA | Monomer M7 | Methyl Methacrylate | BASF |
| AA | Monomer M3 | Acrylic Acid | Arkema |
| MAA | Monomer M3 | Methacrylic Acid | BASF |
| Silquest ® A174NT | Monomer M4 | Methacryloxy functional trimethoxy silane | Momentive |
| AAEM | Monomer M8 | AcetoAcetoxyEthyl Methacrylate | Eastman |
| MADAME | Monomer M8 | DiMethylAminoEthyl Methacrylate | BASF |
| $(NH_4)_2S_2O_8$ | Peroxide | Ammonium persulfate | Aldrich |
| TBHP | Peroxide | 70% tert-Butyl hydroperoxide | Aldrich |
| SFS | Reducing agent | Sodium formaldehyde sulfoxylate | Bruggeman |
| $NH_4OH$ | Neutralization Base | Ammonium hydroxide | Prolabo |
| Acticide MBS | Biocide | Aqueous solution of methylisothiazoline (MIT) and of benzisothiazolinone (BIT) (2.5% MIT/2.5% BIT) | Thor |

A) Description of the Syntheses

1) Procedure for Preparing the Dispersions

This procedure describes below the synthesis of the dispersion according to the examples of the invention.

Specifically, the Tgs of the core (Tg1) and of the shell (Tg2) are adjusted by varying the weight ratio of styrene, of methyl methacrylate and of butyl acrylate present in each of the phases P1 and P2 according to Fox's law and in such a way as to obtain, with the other monomers present, the total weight percentage of each of the phases P1 and P2, the sum thereof coming to 100.

1.1) Equipment Used

A 10 L (internal capacity) steel reactor equipped with a jacket, an efficient stirrer (vortex), a three-flow condenser, a control and a regulator of the material temperature. The reactor comprises the number of the introduction connections necessary for separate introduction of the various components and also an introduction dedicated to inertizing the amenity with nitrogen. The leaktightness is checked before each synthesis. The installation is equipped with a system for controlling the introduction rates of the components.

1.2) Description of the General Procedure for the Dispersions of Tests 1 to 5 (Latex 1 to 5) According to the Invention The water used for all the preparations is demineralized (<5 mScm$^{-1}$) and deoxygenated (N2).

Preparation of the Initial Charge

The surfactant, 24 g of Disponil® FES 32, is dissolved in the amount of water intended for this purpose in the feedstock, i.e. 1459.2 g. The temperature of the mixture is brought to 85° C. for the seeding.

Preparation of the Pre-Emulsion P1

The surfactant, 216 g of Polirol® PHE925A, is dissolved in the amount of water intended for the pre-emulsion: 1350 g.

Once the surfactant has been dissolved, the monomers are added in turn and with stirring:

1369.8 g of styrene
1425.6 g of BuA
3.6 g of Silquest® A174NT
126 g of MAA

The pre-emulsion thus formed is white and stable, at least for the time of the synthesis. It is kept slowly stirring. It will be used for the synthesis of the particle core.

Preparation of the Premix (Pre-Emulsion) P2

The following are added in turn and with stirring:

299.7 g of BuA
177.3 g of styrene
144 g of MMA
54 g of AAEM

This premix will be used for the synthesis of the particle shell.

Preparation of the Peroxide Solution 12.8 g of ammonium persulfate are dissolved in 113.4 g of water.

Preparation of the Aqueous Ammonia Solution 57.73 g of 28% NH$_4$OH solution are diluted in 77.06 g of water.

Preparation of the Solutions for the Redox Treatment 7.71 g of TBHP (70% solution) are dissolved in 33.82 g of water.

4.68 g of SFS in 84.60 g of water.

Polymerization i) Seeding

5% of the pre-emulsion 1, i.e. 224.55 g, are introduced, at 85°, for the seeding. Once the temperature has stabilized, 25% of the ammonium persulfate solution is added, i.e. 31.5 g.

ii) Synthesis of the core P1

At the maximum of the exothermy, the separate introductions of the following begin for a period of 180 minutes and at a material temperature stabilized at 85±2° C.:

| 1. | 4266.45 g of the pre-emulsion P1 | (95%) |
| 2. | 32.76 g of the peroxide solution | (26%) |
| 3. | 64.79 g of the aqueous ammonia solution | (48.1%) |

Important:

The pH of this part of the synthesis is between 4.5 and 5 if the acid is MAA. It is less than 3 for the other carboxylic acids, namely acrylic acid, fumaric acid or itaconic acid. In this case, the amount of aqueous ammonia solution is adjusted.

iii) Heat curing step

Once P1 has finished being run in, the preemulsifyer is rinsed and rinsing water, 104.5 g, is introduced into the reactor. The temperature is then maintained at 85° C. for 15 minutes.

iv) First-part finishing step

Introduction, over the course of 60 min, of 13% of the peroxide solution, i.e. 16.38 g, still at 85° C., followed by heat curing for 15 min.

v) Addition of 51.9% of the aqueous ammonia solution, 68.74 g, over the course of approximately 30 min, which is an amount sufficient to have a pH of 7.5.

vi) Synthesis of the shell P2

The following are introduced at 85° C., over the course of 60 min:

100% of the premix P2, 675 g.
24.1% of the peroxide (ammonium persulfate) solution, i.e. 30.37 g.

The preemulsifyer is then rinsed and rinsing water, 69.66 g, is introduced into the reactor. This step is followed by a final running in of the peroxide solution over a period of 30 min, still at 85° C.:

11.9% of the peroxide (ammonium persulfate) solution, i.e. 15 g.

At the beginning of this (shell synthesis) step, the pH is, by virtue of the addition of the aqueous ammonia solution (v), at 8 and rapidly stabilizes (in less than 30 min) at 7.5. It remains at this value until the end of the synthesis.

The end of this (shell synthesis) step is followed by heat curing for 60 min.

vii) Redox treatment

A solution of TBHP is run in, at 60° C., at the same time as a solution of SFS:

41.54 g of TBHP solution at 13% for 60 min.
89.28 g of SFS solution at 5% for 75 min.

viii) Final additions

At 30-35° C., the latex is neutralized by addition of aqueous ammonia solution at pH 8 with post-addition of Acticide MBS (18.9 g). The soiling of the reactor is <0.1% and the amount of grits obtained by filtration on 100 μm cloth is 10 ppm. The final size is 120 nm, the MFFT measured is 20° C.

2) Physicochemical Characterization of the Dispersions a) Solids Content (SC)

The solids content of the aqueous dispersions is measured according to standard ISO 3251.

b) DH

The pH of the aqueous dispersions is measured according to standard ISO 976.

c) Viscosity

The viscosity of the aqueous dispersions is measured according to standard ISO 2555.

d) Particle Size

The particle size is measured by photon correlation spectroscopy (PCS), using an N4+ machine from Beckman Coulter. The sample is diluted (3 to 5 drops of emulsion in 50 ml of water) in a polystyrene tank using deionized water on a 0.22 µm cellulose acetate filter. The particle size is measured at a temperature of 25° C., at a measuring angle of 90° and at a laser wavelength of 633 nm.

e) Minimum Film-Forming Temperature (MFFT)

The MFFT of the aqueous dispersions is measured according to standard ISO 2115.

f) The Level of Fouling

The level of fouling quantifies the soiling of the reactors by the synthesis of aqueous dispersions of homopolymers or of copolymers. It is evaluated internally by the CRO-WBP-103 method. The soiling is of two types:
- the fouling, that is to say any deposit of polymer located under the final level of the latex retained on the anchor, the temperature wells, the baffles or the walls of the reactor.
- the surface skins, which, when they form, usually appear upon cooling of the latex.

They should not be included in the calculation of the fouling.

After recovery, these deposits are washed with water, then dried in a ventilated oven at 105° C. until the weight is constant (approximately 2 hours). The result is expressed as percentage relative to the theoretical weight of latex produced.

g) Level of Grit

Any particles contained in the latex which have a diameter much larger than the average diameter of the particles of the latex (several hundred times larger) and constituting a filtration residue are considered to be grits. The level of grits is evaluated Internally by the CRO-WBP-104 method according to standard ISO 4576. A part of the latex is filtered through a 100 µm cloth pre-weighed on a precision balance. Any trace of latex is then removed from this cloth, which is then washed and oven-dried at 105° C. until the weight is constant. The cloth is thus weighed and compared to the first value.

3) Log Kow of the Monomers

This parameter is determined (calculated) according to the "Estimation Programs Interface (EPI) Suite®" method developed by the US Environmental Protection Agency's Office of Pollution Prevention and Toxics and Syracuse Research Corporation (SRC), with EPIWEB 4.1. Table 2 below presents the values calculated for this parameter for some monomers.

TABLE 2

| Monomers | Log Kow (EPIWEB 4.1) | |
|---|---|---|
| Acrylamide | −0.8074 | |
| Itaconic acid | −0.3434 | |
| Acetoacetylethyl methacrylate | 0.2393 | |
| Hydroxyethyl methacrylate | 0.3014 | |
| Ureido methacrylate | 0.409 | |
| Acrylic acid | 0.4415 | |
| Gamma-Methacryloxypropyl trimethoxysilane | 0.7532 | |
| Dimethylaminoethyl methacrylate | 0.9723 | |
| Methacrylic acid | 0.9888 | |
| Methyl acrylate | | 0.7278 |
| Ethyl acrylate | | 1.2189 |
| Methyl methacrylate | | 1.2751 |
| Ethyl methacrylate | | 1.7662 |
| Butyl acrylate | | 2.2011 |
| Isobutyl methacrylate | | 2.6749 |
| Butyl methacrylate | | 2.7488 |
| Ethylhexyl acrylate | | 4.5831 |
| Isobornyl methacrylate | | 4.7589 |
| Lauryl acrylate | | 6.1299 |
| Acrylonitrile | | 0.2092 |
| Vinyl acetate | | 0.7278 |
| Styrene | | 2.8950 |

Calculations of the Hansch Parameter and of the Fox Tgs of the Polymers of the Dispersions (Latex) According to the Invention The Hansch parameter for the polymer under consideration is rounded up to one decimal and calculated by adding the products of the mass fractions $m_i$ multiplied by the corresponding $LogKow_i$ of each monomer $M_i$ of the polymer under consideration:

$$\text{Hansch parameter} = \Sigma_i[m_i \cdot LogKow_i]$$

The Tgs of the polymers are calculated using the Fox equation:

$$1/Tg(Tg \text{ in } °K) = \Sigma_i(m_i/Tg_i)$$

with $m_i$=mass fraction of the monomer M in the copolymer
with $\Sigma_i m_i = 1$
$Tg_i$=Tg of the homopolymer derived from $M_i$, in °K.

The Tgs of the homopolymers are (for example) available in the Polymer Handbook, edited by J. Brandrup and E. H. Immergut, Interscience Publishers 3rd Printing June 1967.

They are reproduced below for the monomers used in tables 3 and 4. Table 3 also presents the calculated Tgs and the composition of P1 and P2 and table 4 presents the Hansch parameters calculated for each polymer P1 and P2 of each dispersion (latex) examined according to the invention.

TABLE 3

| Composition | | Latex 1 | | Latex 2 | | Latex 3 | | Latex 4 | | Latex 5 | |
|---|---|---|---|---|---|---|---|---|---|---|---|
| monomers | Tg °C. | P1 | P2 | P1 | P2 | P1 | P2 | P1 | P2 | P1 | P2 |
| BuA | −54 | 39.55 | 7.95 | 39.6 | 8.325 | 39.6 | 8.075 | 38.4 | 7.7 | 38.4 | 7.7 |
| Styr | 100 | 38 | 4.55 | 38.05 | 4.925 | 38.05 | 4.675 | 39.25 | 4.05 | 37.75 | 4.05 |
| MMA | 105 | | 4 | | 4 | | 4 | | 4 | | 4 |
| Silquest ® | — | 0.2 | | 0.1 | | 0.1 | | 0.1 | | 0.1 | |
| MAA | 228 | 3.5 | | 3.5 | | 3.5 | | | | | |
| AA | 106 | | | | | | | 3.5 | | 5 | |
| MADAME | 19 | | 2.25 | | | | 1 | | | | |
| AAEM | 18 | | | | 1.5 | | 1 | | 3 | | 3 |
| Total P1/P2 | | 81.25 | 18.75 | 81.25 | 18.75 | 81.25 | 18.75 | 81.25 | 18.75 | 81.25 | 18.75 |
| Σ P1 + P2 | | 100.00 | | 100.00 | | 100.00 | | 100.00 | | 100.00 | |
| Tg Fox °C. | | 7 | 7.7 | 7 | 7 | 7 | 7.5 | 7 | 7.2 | 7.1 | 7.2 |

TABLE 3-continued

| Composition | | Latex 1 | | Latex 2 | | Latex 3 | | Latex 4 | | Latex 5 | |
|---|---|---|---|---|---|---|---|---|---|---|---|
| monomers | Tg ° C. | P1 | P2 | P1 | P2 | P1 | P2 | P1 | P2 | P1 | P2 |
| Average Tg Fox ° C. (vs P1 + P2) | | 7.1 | | 7 | | 7.1 | | 7 | | 7.1 | |

TABLE 4

Hansch parameter for P1, P2 of latexes 1 to 5 according to the invention

| | | Latex 1 | | Latex 2 | | Latex 3 | | Latex 4 | | Latex 5 | |
|---|---|---|---|---|---|---|---|---|---|---|---|
| Monomers | LogKow | P1 | P2 | P1 | P2 | P1 | P2 | P1 | P2 | P1 | P2 |
| BuA | 2.2011 | 0.487 | 0.42 | 0.487 | 0.444 | 0.487 | 0.431 | 0.473 | 0.41 | 0.473 | 0.41 |
| Styr | 2.895 | 0.468 | 0.24 | 0.468 | 0.263 | 0.468 | 0.249 | 0.483 | 0.22 | 0.465 | 0.22 |
| MMA | 1.2751 | 0 | 0.21 | 0 | 0.213 | 0 | 0.213 | 0 | 0.21 | 0 | 0.21 |
| Silquest ® | 0.7532 | 0.002 | 0 | 0.001 | 0 | 0.001 | 0 | 0.001 | 0 | 0.001 | 0 |
| MAA | 0.9888 | 0.043 | 0 | 0.043 | 0 | 0.043 | 0 | 0 | 0 | 0 | 0 |
| AA | 0.4415 | 0 | 0 | 0 | 0 | 0 | 0 | 0.043 | 0 | 0.062 | 0 |
| MADAME | 0.9723 | 0 | 0.12 | 0 | 0 | 0 | 0.053 | 0 | 0 | 0 | 0 |
| AAEM | 0.2393 | 0 | 0 | 0 | 0.08 | 0 | 0.053 | 0 | 0.16 | 0 | 0.16 |
| Hansch parameter vs P1 and P2 | | 2.47 | 2.02 | 2.47 | 2.03 | 2.47 | 2.01 | 2.46 | 1.84 | 2.41 | 1.84 |
| Difference in Hansch parameter of P1 vs P2 | | 0.45 | | 0.44 | | 0.46 | | 0.62 | | 0.57 | |

4) Characteristics of the "Latex 1 to 5" Dispersions According to the Invention

TABLE 5

| Characteristics | Latex 1 | Latex 2 | Latex 3 | Latex 4 | Latex 5 |
|---|---|---|---|---|---|
| MFFT (° C.) | 21 | 20 | 20 | 22 | 22 |
| SC (%) | 50.4 | 50.8 | 50.5 | 50.1 | 51.5 |
| Particle size (nm) | 125 | 120 | 130 | 120 | 130 |
| pH | 8 | 7.5 | 8 | 8.5 | 8 |
| Brookfield Viscosity (mPa · s) | 1800 | 600 | 1400 | 1100 | 7000 |
| Level of fouling (as %) | 0.1 | 0.1 | 0.1 | 0.1 | 0.1 |
| Level of grits (in ppm) | 60 | 10 | 20 | 30 | 40 |

5) Commercial Latexes Outside the Invention as Comparison Reference

Four styrene-acrylic-type latexes, prepared in one or two steps and having, as difference with respect to the invention, at least the absence of a monomer as defined according to M7 in the P2 phase (in this case absence of MMA vs examples of the Invention), are taken as comparison reference.

TABLE 6 comparative reference latexes

| | Latex A | Latex B | Latex C | Latex D |
|---|---|---|---|---|
| Styrene/Acrylic Latex | X | X | X | X |
| One-step synthesis | X | X | | |
| Two-step synthesis | | | X | X |
| MFFT <5° C. | X | | X | |
| MFFT 20° C. | | X | | X |
| Solids (%) | 50 | 50 | 45 | 50 |
| Particle size (nm) | 150 | 150 | 100 | 100 |
| pH | 8 | 8 | 8 | 8 |
| Brookfield Viscosity (mPa · s) | <2500 | <9000 | <1000 | <2000 |

B) Applicative Results

1) Preparation of the Paint Formulations Based on the Aqueous Dispersions (Latexes)

The performance levels of the aqueous dispersions described previously are evaluated on films applied using formulations of gloss paints of PVC=16.

1.1) Starting Materials Used for the Formulation of the Paints Outside the Aqueous Dispersions (Latexes) Compared

TABLE 7

| Constituents | Function | Chemical nature | Supplier |
|---|---|---|---|
| BYK ® 024 | Antifoam | Mixture of polysiloxanes in a polyglycol and of hydrophobic solid particles | BYK additives & instruments |
| ACTICIDE ® MBS | Biocide | Aqueous solution of methylisothiazoline (MIT) and of benzisothiazoline (BIT) | Thor |
| DISPERBYK ® 190 | Dispersant | High-molecular-weight block copolymer | BYK additives & instruments |
| TIONA ® 595 | Pigment | Titanium dioxide | Cristal Global |
| TEXANOL ® | Coalescence agent | 2,2,4-Trimethyl-1,3-pentanediol monoisobutyrate | Eastman |
| COAPUR ® 2025 | Thickener | Associative polyurethane thickener | Coatex |

1.2) Procedure for Formulation of the Paints with PVC=16 (PVC: Pigment Volume Concentration)

1.2.1) Production of the Milling Base

Equipment required:
Container: jacket cooled by the mains water network
Disperser: Disperlux® modèle 2075
Dispersion paddle: diameter equivalent to one third of the container diameter.

The water and the various constituents are introduced successively into the container with stirring. The stirring is then an increased to high speed until a milling base with a fineness <10 μm is obtained.

1.2.2) Production of the Paint

Equipment required:
Container plastic beaker
Disperser. Disperlux® modèle 2075
Dispersion paddle: diameter greater than two thirds of the container diameter.

The binder, the coalescence agent, the milling base previously prepared and the various constituents are introduced successively into the container with stirring. Care is taken not to introduce the coalescence agent and the thickener too rapidly (dropwise is recommended).

The precise compositions of all the paint formulations based on the various aqueous dispersions of polymer (latexes) tested are presented in table 8 below.

Stain Resistance

The resistance to domestic stains is tested on the paints applied at a wet thickness of 200 μm to Leneta P121-10N PVC sheets after one week of drying at 23° C. and 50% RH (RH: relative humidity). The stains are in contact with the paint to be tested for 15 min and 1 hour. Grading from 1 to 5 is carried out according to standard NF EN 12720 after cleaning the stain with a dilute solution of Teepol. This grading takes into account the losses of gloss, the variations in coloring or the modifications of the structure of the film of paint tested:

5: No visible change (no damage).
4: Slight change in gloss or in color, visible only when the light source is reflected on the test surface or from very close to the point examined and is sent back to the eye of the observer, or a few barely visible isolated marks.
3: Slight mark, visible from various observation angles.
2: Pronounced mark, the structure of the surface being, however, virtually unchanged.
1: Pronounced mark, the structure of the surface being modified or else the material being totally or partially removed.

The stains tested are based on: red wine, coffee, blue ink, window cleaner, ketchup, hand cream, "Stabilo" fluorescent highlighter.

TABLE 8

Composition of the paint formulations based on the (latex) dispersions tested

| Constituents | Function | Parts by weight (%) |
|---|---|---|
| WATER | Solvent | 4.00 |
| BYK® 024 | Antifoam | 0.10 |
| ACTICIDE® MBS | Biocide | 0.20 |
| DISPERBYK® 190 | Dispersant | 0.85 |
| TIONA® 595 | Pigment | 21.00 |
| Total of the milling base | | 26.15 |

| Additional paint components based on | | Latex A | Latex B | Latex C | Latex D | Latex 1 | Latex 2 | Latex 3 | Latex 4 | Latex 5 |
|---|---|---|---|---|---|---|---|---|---|---|
| AQUEOUS ACRYLIC DISPERSION (latex) | Binder | 51.76 | 59.94 | 68.66 | 57.09 | 57.75 | 57.26 | 57.63 | 58.25 | 58.63 |
| TEXANOL® | Coalescence agent | — | 1.75 | — | 1.71 | 1.75 | 1.75 | 1.75 | 1.75 | 1.75 |
| WATER | Solvent | 14.45 | 9.25 | 1.92 | 11.96 | 11.44 | 11.57 | 11.38 | 11.12 | 10.74 |
| COAPUR® 2025 | Thickener | 7.64 | 2.91 | 3.27 | 3.09 | 2.91 | 3.27 | 3.09 | 2.73 | 2.73 |

Paint total 100.00

Formulation characteristics
Calculated using the PV-FORMULA formulation software, version 4-13, of François Magnin & Pierre Vergne - License number 5607-8859-6615-7893

| | | Latex A | Latex B | Latex C | Latex D | Latex 1 | Latex 2 | Latex 3 | Latex 4 | Latex 5 |
|---|---|---|---|---|---|---|---|---|---|---|
| PVC (without adjuvant) | % | | | | | 16.00 | | | | |
| Density | g/cm³ | 1.19 | 1.22 | 1.23 | 1.21 | 1.22 | 1.22 | 1.22 | 1.22 | 1.22 |
| Solids content by weight | % | 49.50 | 51.37 | 51.79 | 50.77 | 51.28 | 51.35 | 51.32 | 51.26 | 51.27 |
| Solids content by volume | % | 40.60 | 40.39 | 40.70 | 40.13 | 40.35 | 40.44 | 40.40 | 40.31 | 40.32 |

The results are presented in table 9 below:

TABLE 9 comparative results on stain resistance

| Test | Stain tested | Paints based on the dispersions | | | | | | | | |
|---|---|---|---|---|---|---|---|---|---|---|
| | | Latex A | Latex B | Latex C | Latex D | Latex 1 | Latex 2 | Latex 3 | Latex 4 | Latex 5 |
| Stain resistance Grading according to NF EN 12720 | Red wine | 2/2 | 2/2 | 2/2 | 2/2 | 4/3 | 4/3 | 4/3 | 4/3 | 4/3 |
| | Coffee | 2/2 | 3/3 | 2/2 | 2/2 | 4/3 | 4/3 | 4/3 | 4/3 | 4/3 |
| | Blue ink | 2/2 | 3/3 | 3/3 | 2/2 | 4/3 | 4/3 | 4/4 | 4/4 | 4/4 |
| | "Stabilo" | 2/2 | 3/3 | 2/2 | 2/2 | 5/5 | 5/5 | 5/5 | 5/5 | 5/5 |
| | Window cleaner | 3/3 | 4/1 | 3/3 | 4/4 | 4/4 | 4/4 | 4/4 | 4/4 | 4/4 |
| | Hand cream | 4/3 | 4/1 | 4/4 | 4/4 | 4/4 | 4/4 | 4/4 | 4/4 | 4/4 |
| | Ketchup | 5/4 | 4/4 | 5/4 | 5/5 | 5/5 | 5/5 | 5/5 | 5/5 | 5/5 |

The invention claimed is:

1. An aqueous coating composition comprising, as binder, an aqueous polymer dispersion wherein said polymer dispersion has a minimum film-forming temperature (MFFT) according to ISO 2115 between 0 and 50° C., and comprises polymer particles obtained by radical emulsion polymerization in at least two steps, and wherein said particles comprise at least two polymer phases P1 and P2, with the P1 polymer phase representing from 75% to 90% by weight of the total polymer P1+P2 and the P2 polymer phase representing from 10% to 25% by weight of the total polymer P1+P2, with P1 having a glass transition temperature Tg1 calculated according to Fox, ranging from 0 to 40° C., and P2 having a glass transition temperature Tg2 calculated according to Fox, ranging from 0 to 40° C., which may be identical or different and with said P1 polymer comprising structural units derived from 4 monomers M1 to M4 as follows:
  at least one ethylenically unsaturated monomer M1 chosen from $C_4$ (meth)acrylic esters, and
  at least one ethylenically unsaturated monomer M2 chosen from vinyl aromatic monomers, and
  at least one ethylenically unsaturated monomer M3 bearing a carboxylic acid group, and
  at least one monomer M4 having a function of internal crosslinking agent of said P1 phase, said P2 polymer comprising structural units derived from 4 monomers M5 to M8 as follows:
  at least one ethylenically unsaturated monomer M5 chosen from $C_4$ (meth)acrylic esters, which may be identical to or different than M1,
  at least one ethylenically unsaturated monomer M6 chosen from vinyl aromatic monomers, which monomer M6 may be identical to or different than M2, and
  at least one ethylenically unsaturated monomer M7, the homopolymer of which has a Tg measured by DSC at 10° C./min of between 80 and 120° C. and a hydrophobicity value estimated by the logarithm of the partition coefficient between octanol and water (LogKow), Estimation Program Interface Suitee KowWin of the US Environmental Protection Agency's Office of Pollution Prevention and Toxics and Syracuse Research Corporation (SRC) according to EPIWEB 4.1, ranging from 1 to 1.5, and
  at least one ethylenically unsaturated monomer M8 bearing an acetoacetoxy or amine or ureido functional group, said acetoacetoxy, amine or ureido functional group being borne by the external surface of the shell polymer phase P2, the P2 polymer phase thus obtained from M5, M6, M7 and M8 having a hydrophobicity characterized by the Hansch parameter rounded up to one decimal, of less than or equal to 2.0, calculated by adding the products of the mass fractions multiplied by the LogKow corresponding to each component monomer and with P2 being in the external layer of said polymer particle.

2. The composition as claimed in claim 1, wherein said binder is free of any monomer bearing a phosphate, phosphine, phosphonic, phosphodiester or fluorinated functional group, strong anionic acid group, and wherein said coating composition is free of any silicone additive, fluorinated additive or microwax additive and of any addition of polymer or oligomer additives having a Tg greater than the average Fox Tg of polymer P1+P2, whether this addition is in dispersion form or whether it is in water-dispersible form.

3. The composition as claimed in claim 1 wherein said $C_4$ (meth)acrylic ester monomer M1 is selected from the group consisting of: n-butyl acrylate, n-butyl methacrylate, isobutyl acrylate isobutyl methacrylate, tert-butyl acrylate and tert-butyl methacrylate.

4. The composition as claimed in claim 1 wherein said monomer M3 is selected from the group consisting of acrylic acid, methacrylic acid, fumaric acid and itaconic acid.

5. The composition as claimed in claim 1 wherein said monomer M4 is chosen from the group consisting of multifunctional (meth)acrylic esters and a (meth)acrylate bearing an alkoxy-blocked silane group —$Si(OR)_3$, with R being methyl or ethyl.

6. The composition as claimed in claim 1 wherein said monomer M8 is selected, for the acetoacetoxy functional group, from the group consisting of acetoacetoxy ethyl (meth)acrylate (AAEM) and, for the amino functional group, from the group consisting of 2-dimethylaminoethyl (meth)acrylate (MADAME) and, for a ureido functional group, from the group consisting of ureido (meth)acrylates.

7. The composition as claimed in claim 1 wherein said coating is a paint, varnish or ink.

8. The composition as claimed in claim 1 which is a barrier coating composition.

9. The composition as claimed in claim 1 which is a corrosion-resistant coating composition.

10. The composition as claimed in claim 1 which is a stain-resistant and corrosion-resistant coating composition.

11. The composition as claimed in claim 1 wherein said Hansch parameter for the P1 polymer is different and higher than the Hansch parameter of the P2 polymer, by at least 0.2 unit.

12. An aqueous polymer dispersion, wherein said polymer dispersion has a minimum film-forming temperature (MFFT) according to ISO 2115 between 0 and 50° C., and comprises polymer particles obtained by radical emulsion polymerization in at least two steps and said particles comprise at least two polymer phases P1 and P2, with the P1 polymer phase representing from 75% to 90% by weight of the total polymer P1+P2 and the P2 polymer phase representing from 10% to 25% by weight of the total polymer P1+P2, with P1 having a glass transition temperature Tg1 calculated according to Fox, ranging from 0 to 40° C. and P2 having a glass transition temperature Tg2 calculated according to Fox, ranging from 0 to 40° C., which may be identical or different and with said P1 polymer comprising structural units derived from 4 monomers M1 to M4 as follows:
- at least one ethylenically unsaturated monomer M1 chosen from $C_4$ (meth)acrylic esters, and
- at least one ethylenically unsaturated monomer M2 chosen from vinyl aromatic monomers, and
- at least one ethylenically unsaturated monomer M3 bearing a carboxylic acid group, and
- at least one monomer M4 having a function of internal crosslinking agent of said P1 phase, chosen from monomers bearing at least two ethylenic unsaturations that are copolymerizable with the ethylenic unsaturations of the monomers M1 to M3 or bearing an ethylenic unsaturation and a blocked silane functional group in alkoxysilane form, said P2 polymer comprising structural units derived from 4 monomers M5 to M8 as follows:
- at least one ethylenically unsaturated monomer M5 chosen from $C_4$ (meth)acrylic esters which may be identical to or different than M1,
- at least one ethylenically unsaturated monomer M6 chosen from vinyl aromatic monomers, which monomer M6 may be identical to or different than M2, and
- at least one ethylenically unsaturated monomer M7, the homopolymer of which has a Tg measured by DSC at 10° C./min of between 80 and 120° C. and a hydrophobicity value estimated by the logarithm of the partition coefficient between octanol and water (LogKow), Estimation Program Interface Suite® KowWin of the US Environmental Protection Agency's Office of Pollution Prevention and Toxics and Syracuse Research Corporation (SRC) according to EPIWEB 4.1, ranging from 1 to 1.5, said monomer M7, and
- at least one ethylenically unsaturated monomer M8 bearing an acetoacetoxy or amine or ureido functional group, said acetoacetoxy, amine or ureido functional group being borne by the external surface of the shell polymer phase P2, the P2 polymer phase thus obtained from M5, M6, M7 and M8 having a hydrophobicity characterized by the Hansch parameter rounded up to one decimal, of less than or equal to 2.0, calculated by adding the products of the mass fractions multiplied by the LogKow corresponding to each component monomer and with P2 being in the external layer of said polymer particle.

13. A process for preparing the aqueous dispersion of claim 12, comprising at least two steps, of polymerization corresponding respectively to the P1 and P2 polymer phases:
- i) first step of emulsion polymerization, including a step of polymer seeding, of a first composition of monomers comprising in emulsion said monomers M1, M2, M3 and M4 as defined in claim 12 and corresponding to the P1 polymer phase, with said monomer M3 being in predominantly salified form, and followed by a
- ii) second step of emulsion polymerization of a second composition of monomers comprising in emulsion said monomers M5, M6, M7 and M8 as defined in claim 12 and corresponding to the P2 polymer phase, said polymerization being carried out under pH conditions of less than or equal to 9.

\* \* \* \* \*